United States Patent
Yamashita et al.

(10) Patent No.: US 7,655,365 B2
(45) Date of Patent: Feb. 2, 2010

(54) WETTABILITY VARIABLE SUBSTRATE AND WETTABILITY VARIABLE LAYER FORMING COMPOSITION

(75) Inventors: Kaori Yamashita, Shinjuku-ku (JP); Hironori Kobayashi, Shinjuku-ku (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 10/610,126

(22) Filed: Jun. 30, 2003

(65) Prior Publication Data

US 2004/0132946 A1    Jul. 8, 2004

(30) Foreign Application Priority Data

Jul. 1, 2002    (JP) .............................. 2002-192317

(51) Int. Cl.
G03F 7/038    (2006.01)
G03F 7/20    (2006.01)

(52) U.S. Cl. .................. 430/18; 430/9; 430/270.1; 430/271.1; 430/311; 430/315; 430/321; 430/905

(58) Field of Classification Search .............. 430/271.1, 430/302, 270.1; 528/12; 428/446
See application file for complete search history.

(56) References Cited

U.S. PATENT DOCUMENTS

| | | | |
|---|---|---|---|
| 5,523,161 A * | 6/1996 | Goodwin | 428/421 |
| 6,576,393 B1 * | 6/2003 | Sugita et al. | 430/270.1 |
| 2001/0009936 A1 * | 7/2001 | Suzuki et al. | 524/35 |
| 2002/0121206 A1 * | 9/2002 | Ooishi | 101/450.1 |
| 2003/0008217 A1 * | 1/2003 | Kobayashi | 430/5 |
| 2003/0087073 A1 * | 5/2003 | Kobayashi | 428/209 |
| 2003/0162132 A1 * | 8/2003 | Kobayashi | 430/313 |
| 2003/0194617 A1 * | 10/2003 | Kobayashi | 430/5 |

FOREIGN PATENT DOCUMENTS

| JP | 2000-249821 | | 9/2000 |
|---|---|---|---|
| JP | 2002-139615 | * | 5/2002 |

OTHER PUBLICATIONS

Machine-assisted English translation of JP 2002-139615, provided by JPO.*

* cited by examiner

Primary Examiner—Sin J. Lee
(74) Attorney, Agent, or Firm—Ladas & Parry LLP

(57) ABSTRACT

It is a main object of the present invention to provide a wettability variable substrate provided with a wettability variable layer which is free from any cloud and is superior in adhesion to a substrate, transparency and liquid repellency. The above object is attained by the provision of a wettability variable substrate comprising a wettability variable layer, on a substrate, which the wettability is varied by exposing to light in the presence of a photocatalyst, wherein the wettability variable layer contains an organopolysiloxane which is a co-hydrolysis condensation polymer obtained using (A) one type or two or more types of organopolysiloxane precursors represented by $Y_n SiX_{(4-n)}$ (Y represents an alkyl group or a fluoroalkyl group, or a substituent containing these groups, X represents an alkoxyl group, an acetyl group or a halogen, a letter n subscripted to Y and a letter n in (4-n) subscripted to X are an integer from 1 to 3), and (B) an amorphous silica precursor represented by $SiX_4$ (X is the same as above) by a mass ratio of (A)/(B)=1/0.1 to 1/20.

3 Claims, 2 Drawing Sheets

1 WETTABILITY VARIABLE SUBSTRATE
3 WETTABILITY VARIABLE LAYER
2 FIRST SUBSTRATE

4 PHOTOCATALYST SUBSTRATE
6 PHOTOCATALYST LAYER
5 SECOND SUBSTRATE

WETTABILITY VARIABLE SUBSTRATE AND WETTABILITY VARIABLE LAYER FORMING COMPOSITION

BACKGROUND OF THE INVENTION

1. Field of the Invention

The present invention relates to a wettability variable substrate provided with a wettability variable layer constituted of a co-hydrolysis condensation polymer of an organosiloxane precursor, for example, a fluoroalkylsilane compound and an amorphous silica precursor, and to a functional element formed using the wettability variable substrate by utilizing a difference in wettability which is caused by exposure under the presence of a photocatalyst. Also, the present invention relates to a wettability variable layer forming composition used for forming such as wettability variable layer.

2. Description of the Related Art

As a method of forming a fine pattern, there is a method in which a photoresist layer provided on a raw material which can be etched is subjected to pattern exposure and developing, and etching is carried out utilizing the resultant resist pattern; or a method in which a functional raw material for imparting a necessary function is dissolved or dispersed in a light sensitive resin composition, a layer of the light sensitive resin composition is laminated on a substrate, and pattern exposure and developing are carried out in the same manner as above to pattern the layer of the light sensitive resin composition.

In both of these methods, since developing or etching is carried out, the necessity for treating an effluent, containing the removed resist and raw materials which can be etched, arises and also there is the problem that when functional raw materials are contained, the raw material is deteriorated by an alkali solution and the like used for developing. Also, a printing method can be utilized as a method of producing a fine pattern. It is however difficult to form a highly precise pattern because of a restriction on precision.

As disclosed previously in Japanese Patent Laid Open (JP-A) No. 2000-249821, the inventors of the present invention have proposed to adhere a fine pattern additionally by utilizing a pattern based on a difference in wettability which is obtained by varying the wettability of the surface of silicone and the like by using a photocatalyst. And the inventors found that by using a polysiloxane containing a fluoroalkyl group particularly as the raw material causing the variation in wettability, the drawbacks of conventional methods using a photoresist or a light sensitive resin composition are solved.

Generally, in order to form a polysiloxane containing a fluoroalkyl group on a substrate, an acid or alkali catalyst is added in a coating solution of a fluoroalkylsilane compound which is a precursor of a fluoroalkylsilane to promote hydrolysis and a condensation polymerization reaction, thereby reacting with the surface of the substrate. There is a problem that if these catalysts are added to the coating solution, usable time of the coating solution is shortened or an excess fluorine type component remains on the surface of a wettability variable layer. Because of this, the wettability variable layer becomes clouded and it is necessary to add a wiping process. If no catalyst is added in order to avoid the cloud, the reactivity with the surface of a substrate drops and therefore, a layer having the characteristics such as sufficient durability (adhesiveness), transparency or liquid repellency is not obtained as the resulting wettability variable layer.

SUMMARY OF THE INVENTION

Accordingly, it is an object of the present invention to provide a wettability variable substrate having a wettability variable layer wherein usable time of the coating solution, used when a polysiloxane containing a fluoroalkyl group is formed on a substrate, is long, or the resulting wettability variable layer is free from cloud, and also having sufficient durability such as adhesion to a substrate, transparency or liquid repellency. Another object of the present invention is to provide a substrate, with a fine pattern, using a wettability variable substrate as aforementioned. A further object of the present invention is to provide a wettability variable layer forming composition suitable for manufacturing a wettability variable layer of a wettability variable substrate as aforementioned.

The studies made by the inventors have resulted in the discovery of the fact that any of the above problems can be overcome and also securing wettability by using an amorphous silica precursor in addition to the polysiloxane containing a fluoroalkyl group and thus the present invention has been completed.

A first invention relates to a wettability variable substrate comprising a wettability variable layer, on a substrate, which the wettability is varied by exposing to light in the presence of a photocatalyst, wherein the wettability variable layer contains an organopolysiloxane which is a co-hydrolysis condensation polymer obtained using (A) one type or two or more types of organopolysiloxane precursors represented by $Y_n SiX_{(4-n)}$ (Y represents an alkyl group or a fluoroalkyl group, or a substituent containing these groups, X represents an alkoxyl group, an acetyl group or a halogen, a letter n subscripted to Y and a letter n in (4-n) subscripted to X are an integer from 1 to 3), and (B) an amorphous silica precursor represented by $SiX_4$ (X is the same as above) by a mass ratio of (A)/(B)=1/0.1 to 1/20.

A second invention relates to a pattern formed body comprising a wettability pattern consisting of an unexposed area whose contact angle to a liquid having a surface tension of 40 mN/m is 10° or more, and an exposed area whose contact angle to a liquid having a surface tension of 40 mN/m is 9° or less, obtained by exposing the surface of the wettability variable layer, of the wettability variable substrate according to the first invention, in a pattern in the presence of a photocatalyst.

A third invention relates to a functional element obtained by laminating a functional layer made of a raw material different from the raw material constituting the wettability variable layer, on the surface of the wettability variable layer along the wettability pattern of the pattern formed body according to the second invention.

A fourth invention relates to a wettability variable layer forming composition comprising at least each component of:

(A) organopolysiloxane precursors represented by $Y_n SiX_{(4-n)}$ (Y represents an alkyl group or a fluoroalkyl group, or a substituent containing these groups, X represents an alkoxyl group, an acetyl group or a halogen, a letter n subscripted to Y and a letter n in (4-n) subscripted to X are an integer from 1 to 3);

(B) an amorphous silica precursor represented by $SiX_4$ (X is the same as above); and (C) an aqueous solution containing an acid having an acid concentration of 0.0005N to 0.05N;

wherein a mass ratio of each component (A) to (C) is (A)/(B) =1/0.1 to 1/20, and (C)/((A)+(B))=1/0.25 to 1/30.

A fifth invention relates to a wettability variable layer forming composition comprising at least each component of:

(A) organopolysiloxane precursors represented by $Y_n SiX_{(4-n)}$ (Y represents an alkyl group or a fluoroalkyl group, or a substituent containing these groups, X represents an alkoxyl group, an acetyl group or a halogen, a letter n subscripted to Y and a letter n in (4-n) subscripted to X are an integer from 1 to 3);

(B) an amorphous silica precursor represented by $SiX_4$ (X is the same as above); and (C) an aqueous solution containing an acid having an acid concentration of 0.0005N to 0.05N;

obtained by a co-hydrolysis condensation polymerization reaction using these components as starting material; and wherein a mass ratio of each component (A) to (C) is (A)/(B) =1/0.1 to 1/20, and (C)/((A)+(B))=1/0.25 to 1/30.

According to the present invention, since it is structured by using a co-hydrolysis condensation polymer of an organopolysiloxane precursor such as a fluoroalkylsilane and an amorphous silica precursor, a wettability variable substrate can be provided which is provided with a wettability variable layer which has sufficient liquid repellency, can produce a wettability pattern by carrying out pattern exposure in the presence of a photocatalyst, and also is free from any cloud and is superior in adhesion to a substrate.

DESCRIPTION OF THE PREFERRED EMBODIMENT

Figure 1A:
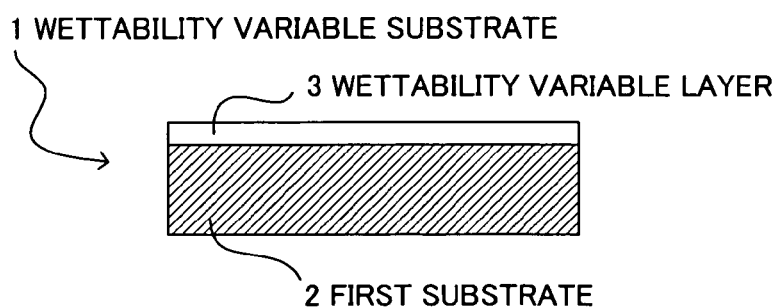
FIGS. 1A, 1B, and 1C are schematic sectional views showing a wettability variable substrate, a photocatalyst substrate and the condition of these substrates when these substrates are laminated and exposed to light.

The component (A) for forming the wettability variable layer is organopolysiloxane precursors represented by a formula $Y_n SiX_{(4-n)}$ (Y represents an alkyl group or a fluoroalkyl group, or a substituent containing these groups, X represents an alkoxyl group, an acetyl group or a halogen, a letter n subscripted to Y and a letter n in (4-n) subscripted to X are an integer from 1 to 3). The number of carbons contained in the whole substituent represented by Y is preferably in a range from 1 to 20 and particularly in a range from 5 to 10. Also, the alkoxyl group represented by X is preferably a methoxy group, ethoxy group, propoxy group or butoxy group. A polysiloxane containing a fluoroalkyl group is preferably used in this manner, and those generally known as fluorine type silane coupling agents may be used.

Examples of the type of fluoroalkylsilane compound used in the present invention include tri-fluoropropyl-tris-(methoxy) silane, tri-fluoropropyl-tri-chlorosilane, trideca-fluorooctyl-tri-chlorosilane, trideca-fluorooctyl-tris-(methoxy) silane, heptadeca-fluorodecyl-tri-chlorosilane, heptadeca-fluorodecyl-tris-(methoxy)silane, heptadeca-fluorodecylmethyl-di-chlorosilane, heptadeca-fluorodecylmethyl-bis-(methoxy) silane, henicosa-fluorododecyl-tris-(methoxy) silane, heptadeca-fluorodecyl-tris-(ethoxy)silane, henicosa-fluorododecyl-tris-(ethoxy)silane, and the like.

The fluoroalkylsilane represented by the formula $Y_n SiX_{(4-n)}$ preferably has a fluorine substituted alkyl group in which three or more atoms are substituted with fluorine atoms. Among these fluoroalkylsilanes, those having a fluorine substituted alkyl group in which nine or more atoms are substituted with fluorine atoms are more preferable, and those having a fluorine substituted alkyl group in which 17 or more atoms are substituted with fluorine atoms are particularly preferable because a contact angle as high as 105° or more can be obtained.

In the present invention, particularly preferable fluoroalkylsilane has a sufficiently large perfluoroalkyl group and also, has three nucleofuge groups (e.g., a halogen, alkoxy, or the like capable of desorbing from a silicon atom and causing a condensation reaction with silanol on the surface of glass), such as heptadeca-fluorodecyl-tris-(methoxy)silane, heptadeca-fluorodecyl-tris-(ethoxy)silane, henicosa-fluorododecyl-tris-(methoxy)silane, henicosa-fluorododecy-tris-(ethoxy)silane.

These organopolysiloxane precursors represented by the above mentioned formula $Y_n SiX_{(4-n)}$ may be used either by itself or by mixing two or more types.

The amorphous silica precursor as the component (B) used to form the wettability variable layer is to contribute to an improvement in the adhesion of the wettability variable layer to the substrate. In the case where the substrate is made of, particularly, glass, the organopolysiloxane precursor as the component (A) inhibits a hydrolysis condensation polymerization reaction with a hydroxyl group on the surface of glass and sufficient adhesion to the surface of the glass can hardly be obtained when containing a fluoroalkyl group. For this, by making the amorphous silica precursor, as the component (B) which is very reactive with the surface of glass, react in the co-hydrolysis condensation polymerization, the adhesion of the wettability variable layer to the surface of glass can be improved.

The component (B) is preferably amorphous silica precursors represented by the formula $SiX_4$ (X is the same as that explained in the aforementioned $Y_n SiX_{(4-n)}$ and represents a halogen, an alkoxyl group such as a methoxy group or an ethoxy group or an acetyl group), silanol which is hydrolysates of these, or polysiloxanes having an average molecular weight of 3000 or less. Specifically, tetraethoxysilane, tetraisopropoxysilane, tetra-n-propoxysilane, tetrabutoxysilane, tetramethoxysilane, or the like can be listed.

Each of the above mentioned component (A) and (B) is used in the ratio (mass ratio) of (A)/(B)=1/0.1 to 1/20 and is applied to a proper substrate as an organopolysiloxane obtained by a co-hydrolysis condensation polymerization reaction, followed by drying, whereby a wettability variable layer can be made. In the present invention, it is preferable that the mass ratio (A)/(B) of the above mentioned components (A) and (B) is in a range from 1/0.2 to 1/15 and particularly in a range from 1/1 to 1/10.

When the mass ratio of the component (A) is less than the lower limit of the above mass ratio, sufficient liquid repellency, such as ink repellency, of the surface is not obtained. Therefore, even if it is intended to carry out patterning of the functional layer forming composition by carrying out exposure in the presence of a photocatalyst to cause a difference in the liquid repellency of the surface, there is a possibility that the functional layer forming composition exists on the unexposed part, which is not undesirable. On the other hand, when the mass ratio of the component (A) exceeds the upper limit of the above mass ratio, the liquid repellency of the wettability variable layer is improved originally, but the unreacted component (A) and its hydrolysates left on the surface are also increased, causing surface cloudiness and a reduction in liquid repellency in a serious case and also causing the wettability layer to be made hydrophilic by a photocatalytic action on the wettability variable layer, incurring, for example, the possibility that the affinity of the wettability variable layer to ink is significantly impaired, which is not desirable. Also, the component (A) is usually expensive, leading to increased cost when the content of the component (A) is increased.

When the mass ratio of the amorphous silica precursor as the component (B) is less than the lower limit of the above mass ratio, sufficient adhesion to the substrate, especially, to the surface of glass is not obtained. On the other hand, when the mass ratio of the component (B) exceeds the upper limit of the above mass ratio, the relative content of the component (A) is decreased. Therefore, the content of the fluoroalkyl group on the surface of the wettability variable layer is decreased when an fluoroalkyl silane which is a preferable organopolysiloxane precursor is used, leading to deteriorated liquid repellency, which is undesirable.

In order to form the wettability variable layer, it is preferable to add the component (C) in the following manner in addition to the component (A) and (B) to prepare and use a wettability variable layer forming composition.

Specifically, the wettability variable layer forming composition of the present invention comprises at least each component of:

(A) organopolysiloxane precursors represented by $Y_n SiX_{(4-n)}$ (Y represents an alkyl group or a fluoroalkyl group, or a substituent containing these groups, X represents an alkoxyl group, an acetyl group or a halogen, a letter n subscripted to Y and a letter n in (4-n) subscripted to X are an integer from 1 to 3);

(B) an amorphous silica precursor represented by $SiX_4$ (X is the same as above); and (C) an aqueous solution containing an acid having an acid concentration of 0.0005N to 0.05N;

wherein a mass ratio of each component (A) to (C) is (A)/(B)=1/0.1 to 1/20, and (C)/((A)+(B))=1/0.25 to 1/30.

The component (C) added to constitute the wettability variable forming composition is an aqueous solution containing an acid working as a catalyst. The acid functions as a catalyst effectively in the reaction of the fluoroalkylsilane with the surface of an inorganic raw material such as glass, improves reactivity with the surface and works to improve liquid repellency. Such an acid in the present invention is added in a state of an aqueous solution containing the acid. The concentration of the acid in the aqueous solution is in a range from 0.0005N to 0.05N as aforementioned, preferably in a range from 0.001N to 0.04N and particularly preferably in a range from 0.002N to 0.02N.

When the acid content is higher than the above range, the pot life as a composition is shortened, this is disadvantageous in process and there is the case where decomposition rate is decreased, which is undesirable. On the other hand, when the acid concentration is less than the above range, the acid can hardly function as a catalyst effectively and there is the case where unreacted parts possibly remain.

As acid to be used in the aqueous solution containing the acid is not particularly limited and for example, the acid may be selected from hydrochloric acid, nitric acid, sulfuric acid, phosphoric acid, formic acid, oxalic acid or acetic acid. In the present invention, it is preferable to use hydrochloric acid or nitric acid. This is because these acids have a high catalytic effect and is also reduced in the possibility of defects being caused when they are used.

In the present invention, the above mentioned component (C) is preferably used in the mass ratio in a range of (C)/((A) + (B))=1/0.25 to 1/30, preferably in a range of 1/0.5 to 1/20, and particularly preferably in a range of 1/1 to 1/10, to the above mentioned components (A) and (B).

When the mass ratio of the aqueous solution containing the acid as the component (C) is less than the lower limit of the above mass ratio, the component does not function as a catalyst effectively, whereas when the mass ratio exceeds the upper limit of the above mass ratio, the usable time of the wettability variable layer forming composition is shortened, which is undesirable.

The wettability variable layer forming composition comprising the components (A) to (C) may be one which is further diluted properly with a hydrophilic organic solvent for the purpose of obtaining a composition having a desired viscosity, for the purpose of obtaining a desired film thickness when it is applied, or for the purpose of extending the usable time of the wettability variable layer forming composition.

The hydrophilic organic solvent used for the above object is an organic solvent capable of dissolving at least 20% or more, preferably 40% or more and more preferably 60% or more of water. The hydrophilic organic solvent is particularly preferably an organic solvent capable of dissolving 80% or more of water and particularly preferably an organic solvent which can be mixed with water in an optional ratio. Incidentally, these "%" indications are on a mass basis.

Specific examples of the hydrophilic organic solvent include alcohols such as methyl alcohol, ethyl alcohol, n-propyl alcohol, isopropyl alcohol and sec-butyl alcohol, or diethylene glycol dimethyl ether, acetone, dimethylformamide (DMF) or dimethyl sulfoxide (DMSO). Among these solvents, alcohols are preferable in the point that these alcohols have good solubility with fluoroalkylsilanes and proper volatility. When alcohols are used as the hydrophilic organic solvent, alcohols having a boiling point of 110° C. or less are preferably used. Also, the hydrophilic organic solvent is preferably those forming an azeotropic mixture with water. The use of such an organic solvent improves drying of a water-repellent treatment agent. From this point of view, it is particularly preferable to use alcohols, such as ethyl alcohol or isopropyl alcohol, which form an azeotropic mixture with water.

Also, the wettability variable layer forming composition of the present invention may be a wettability variable layer forming composition comprising the same components (A) to (C) as above in the same mass ratio as above and obtained by a co-hydrolysis condensation polymerization reaction using these components as starting material. Namely, the wettability variable layer forming composition of the present in invention includes a wettability variable layer forming composition in which a part of the components (A) and (B) are in a condition of being co-hydrolysis condensation polymerization reacted. This is because when making into a wettability variable layer forming composition, there are the cases where better material qualities can be obtained if materials in condition that a co-hydrolysis condensation polymerization reaction has proceeded to some extent.

Here, the condition, that a part of the components (A) and (B) have already been co-hydrolysis condensation polymerization reacted, is preferably a condition that the amount of the substituent X in the components (A) and (B) is decreased by an amount in a range from 10 mol % to 90 mol % and particularly in a range from 25 mol % to 75 mol % compared to the input amount. This is because when less than the above range, there is a possibility that the material qualities of the finally obtained layer have defects, whereas when exceeding the above range, there is a possibility that the composition is gelled.

The wettability variable layer forming composition as aforementioned is stirred and kneaded together with hydrophilic organic solvent or other additives according to the need to prepare a wettability variable layer forming composition in which each component is dissolved or dispersed. By applying and drying the resulting wettability variable layer forming composition to an appropriate substrate, a wettability variable layer can be formed. The thickness of the wettability variable layer is preferably 0.001 µm to 1 µm and more preferably 0.01 µm to 0.1 µm so that a variation in wettability when carrying out exposure in the presence of a photocatalyst is made at a desired rate.

The contact angle of the surface of the wettability variable layer, obtained by the above composition and method for manufacturing, to a liquid having a surface tension of 40 mN/m is preferably 10° or more in an unexposed state, and 9° or less in a state after carrying out exposure in the presence of a photocatalyst. The reason is that if the contact angle is less than 10° in a unexposed state, liquid repellency is insufficient and the possibility of the functional layer forming composition remaining on the wettability variable layer is incurred, whereas if the contact angle exceeds 9° in the condition after carrying out exposure, the functional layer forming composition dose not spread sufficiently on the wettability variable layer, incurring the possibility that a non-coated part occurs within the area to be coated with the functional layer forming composition. If there is 1° or more difference between the contact angle of the unexposed state and that of the exposed state in the presence of a photocatalyst, it is possible to apply the functional layer forming composition selectively on the part with a state of after exposure to light in the presence of a photocatalyst, utilizing the wettability difference.

Although the surface of a wettability variable layer 3 of a wettability variable substrate 1 of the present invention has a contact angle of preferably 10° or more with a liquid having a surface tension of 40 mN/m in an unexposed area, more preferably the contact angle is 10° or more with a liquid having a surface tension of 30 mN/m in an unexposed area, and particularly preferably the contact angle is 10° or more with a liquid having a surface tension of 20 mN/m in an unexposed area. This is because the unexposed area which is unexposed state is a part where liquid repellency is required to repel the functional layer forming composition when a fine pattern is formed, and if the contact angle to a liquid is small, the liquid repellency is insufficient and there is the possibility that the functional layer forming composition remains, which is undesirable. Also, the unexposed area of the wettability variable layer 3 has a critical surface tension of 50 mN/m or more, and preferably 30 mN/m or less.

Although the surface of the wettability variable layer 3 of the wettability variable substrate 1 of the present invention has a contact angle of preferably 9° or less to a liquid having a surface tension of 40 mN/m in the area which is after exposure to light in the presence of a photocatalyst (hereinafter abbreviated simply as "exposed area"), it is preferable that the contact angle to a liquid having a surface tension of 40 mN/m is 9° or less in an exposed area, more preferably the contact angle to a liquid having a surface tension of 50 mN/m is 10° or less in an exposed area, and particularly preferably the contact angle to a liquid having a surface tension of 60 mN/m in an exposed area is 10° or less. If the contact angle of the exposed area to a liquid is high, the functional layer forming composition adhered to this area is insufficiently spread, and there is therefore the possibility that it is not spread through the exposed area.

Regarding the measurement of contact angle to a liquid, the contact angle is obtained either from the results measured 30 seconds after a liquid droplet was dripped from a microsyringe by using a contact angle measuring meter (trade name: CA-Z model, manufactured by Kyowa Interface Science Co., Ltd.) or from a graph based on the results. Also, when measuring the contact angle, commercially available wetting index standard solutions (manufactured by JUNSEI CHEMICAL CO., LTD.) were used as the liquids having various surface tensions.

The wettability variable substrate of the present invention can be made into a pattern formed body having such a wettability pattern that a pattern consisting of a liquid repellent area which is an unexposed area and a lyophilic area which is an exposed area is formed on the wettability variable layer surface by carrying out pattern exposure as also disclosed in JP-A No. 2000-249821. And then, by adhering a functional layer forming composition on the lyophilic area of the pattern formed body to form a functional layer, a functional element having a finely patterned functional layer can be obtained. FIGS. 1 and 2 are views showing a process of forming a pattern formed body and functional element as aforementioned by using the wettability variable substrate of the present invention.

Figure 1B:
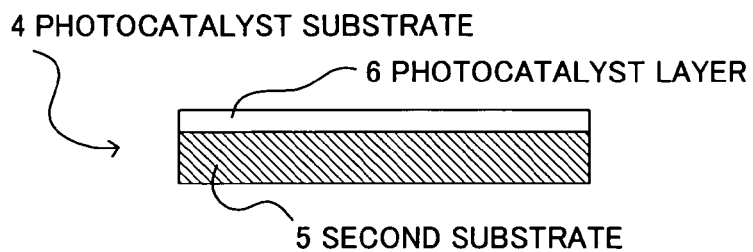

As shown in FIGS. 1A and 1B, a wettability variable substrate 1 and a photocatalyst substrate 4 used to control the wettability of the wettability variable substrate 1 are prepared.

Although the wettability variable substrate 1 normally has a structure in which a wettability variable layer 3 is laminated on a substrate 2 (first substrate), it maybe structured of a wettability variable layer 3 alone. Although the wettability variable layer 3 may be accompanied by a protective layer, it is necessary that at least a part to be used is not accompanied by a protective layer but is bared. Also, the wettability variable layer 3 may be laminated on the entire surface or formed on a part of the surface of the substrate 2.

When the wettability variable substrate 1 is accompanied by the substrate 2, examples of a raw material to constitute the substrate 2 may include glass, aluminum, metals such as an aluminum alloy, plastic, woven fabric and nonwoven fabric. These raw materials may be selected according to the use of the obtained substrate having a fine pattern. It is to be noted that the substrate 2 includes flexible film shaped materials.

The photocatalyst substrate 4 has a structure in which a photocatalyst layer 6 is laminated on a substrate 5 (second substrate) which is different from the substrate 1. The substrate 5 is usually on the exposing side when exposed to light in the presence of a photocatalyst. Therefore, the substrate 5 is preferably formed of, for example, a transparent raw material such as a plastic film or glass, and the photocatalyst layer 6 is a dried coating film of, for example, an inorganic paint containing titanium dioxide.

Figure 1C:
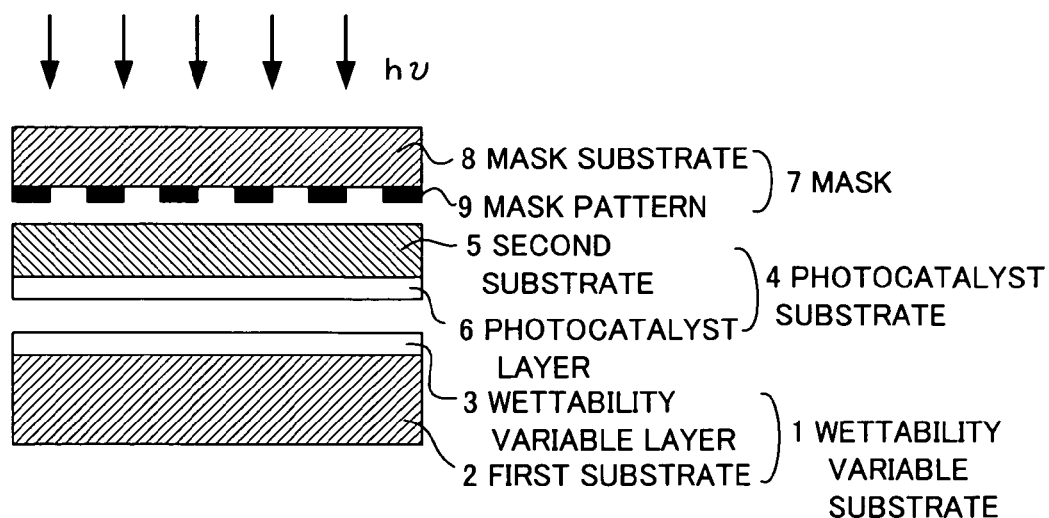

As shown in FIG. 1C, both the wettability variable substrate 1 and the photocatalyst substrate 4 are laminated on each other such that the wettability variable layer 3 and the photocatalyst layer 6 are in contact with each other, and then exposed to light from the substrate 5 side of the catalyst substrate 4 via a mask 7.

Figure 2A:
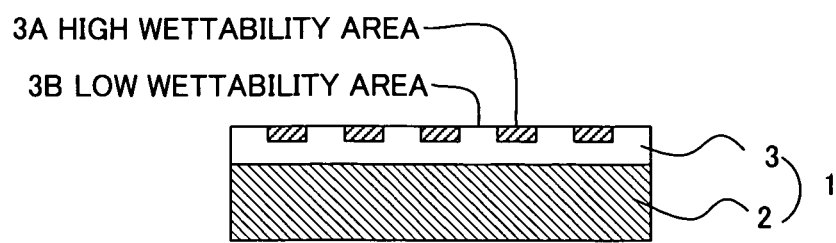
FIGS. 2A, 2B, and 2C are schematic sectional views showing the conditions of a wettability variable substrate after exposed to light, when paint is adhered thereto, and when the paint is solidified.

As shown in FIG. 2A, by the exposure, a pattern formed body with a wettability pattern formed can be formed wherein, on the bared surface of the wettability variable layer 3, the wettability pattern is consisting of areas differing in wettability, a high wettability (lyophilic in other words) area 3A produced by a variation in surface energy in the exposed area and a relatively low wettability (liquid repellent in other words) area 3B where wettability is left as it was in the unexposed area. The reason why a wettability pattern is formed if exposure is carried out in the presence of a photocatalyst is considered that an organic group which is a part of the components of the wettability variable layer 3 is oxidized and decomposed by the action the photocatalyst.

Figure 2B:
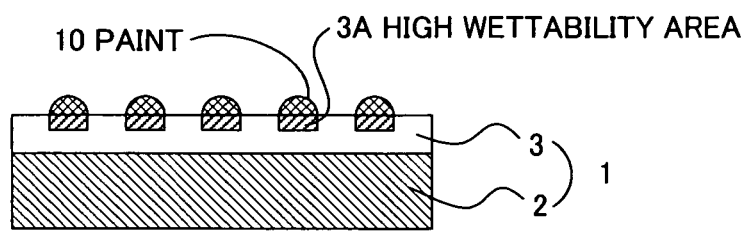
Figure 2C:
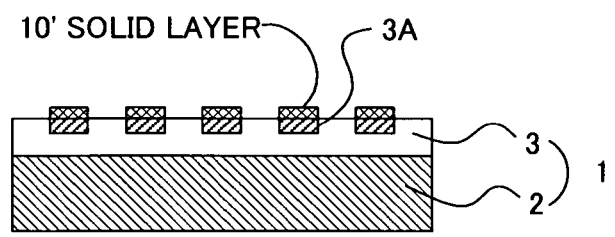

As shown in FIG. 2B, the wettability of the functional layer forming composition and the like is better in the high wettability area 3A compared to other areas, therefore, the functional layer forming composition 10 (indicated simply as Paint in the figure) adheres selectively. When the adhered coating film is solidified by drying or heating, a functional element with a fine pattern of a functional layer can be obtained in which a solid layer 10' obtained by solidifying a solid content contained is an aqueous solution or a water dispersion solution, is formed on the high wettability area 3A as shown in FIG. 2C.

There may be several variations in the ways of laminating the wettability variable substrate 1 and the photocatalyst substrate 4 and in the ways of exposure. First, although the wettability variable substrate 1 and the photocatalyst substrate 4 may be brought into close contact with each other when they are exposed, the both may not be brought into close contact with each other but may be in such a condition that the both are facing each to other with a very small clearance kept in between. The clearance between the wettability variable layer 3 and the photocatalyst layer 6 in this case may be 200 μm or less, which is the acting distance of the both.

Although in the above explanations, the wettability variable substrate 1 and the photocatalyst substrate 4 are exposed to light via different masks, one obtained by forming the mask pattern 9 on either one of the wettability variable substrate 1 or the photocatalyst substrate 4 may be utilized. Alternatively, the exposure is not carried out via a mask but by a method scanning a exposure beam similarly to the case where a photomask for the manufacturing a semiconductor is manufactured. Consequently, any method may be used as long as it can expose in a pattern.

If the photocatalyst is anatase type titanium dioxide, as its exciting wavelength is 380 nm or less, as the exposure light, one having a peak at 380 nm or less maybe used. Therefore, exposure may be carried out by using a ultraviolet light source used for exposure. Various mercury lamps, metal halide lamp, xenon lamp or ultraviolet lamp such as an excimer lamp or as for scanning, laser light sources such as excimer and YAG may be used to carry out exposure.

Various functional elements can be obtained by using the wettability variable substrate of the present invention and selectively using various functional layer forming compositions, according to use, which is prepared by using raw materials different from the raw material constituting the wettability variable layer.

For example, the wettability variable layer is formed on a glass substrate or the like, and by applying coloring layer forming paint compositions such as red, green and blue and a light shielding layer forming paint composition as a functional layer forming composition to the high wettability area 3A with a fine pattern which is obtained by carrying out exposure in the presence of a photocatalyst, a color filter (functional element) used for a liquid crystal display and the like can be obtained. For example, by adhering and solidifying a color filter layer forming ink composition to the wettability variable layer with a finely patterned high wettability area 3A formed thereon, by using an ink jet device, a color layer (functional layer) can be formed easily. Also, the pattern shape itself is determined by the shape of the high wettability area so that it is possible to obtain a highly precise color filter by a simple method with a small number of processes.

Other than the above, the aforementioned procedures may be used for the formation of a micro lens (functional element) using a transparent resin paint composition as a functional layer forming composition, or for the production of a precise electric circuit substrate (functional element) using a conductive paint composition as a functional layer forming composition. A functional element having a fine pattern consisting of a thin layer can be formed by forming a thin film of a metal or the like on the entire surface by vapor deposition or sputtering on the wettability variable layer with a fine patterned high wettability area 3A formed thereon, instead of selectively adhering the functional layer forming composition, and peeling off the thin layer on the part except for the high wettability area 3A by utilizing the fact that the part except for the high wettability area 3A has low adhesion.

The present invention is not limited to the aforementioned embodiments. These above mentioned embodiments are examples and whatever has substantially the same structure and produces the same acting effect as the technical thoughts described in the claims of the present invention is embraced by the technical scope of the present invention.

EXAMPLES

Example 1

A solution consisting of 5 g of tetramethoxysilane (trade name: TSL8114, manufactured by GE Toshiba Silicones Co., Ltd.), 1.5 g of fluoroalkylsilane (trade name: TSL8223, manufactured byGEToshiba Silicones Co., Ltd.) and2.36g of 0.005NHCl (aqueous solution) was stirred at 20° C. for 24 hours. Then, the solution was diluted with isopropyl alcohol by 100 times (weight basis, same for the comparative examples) to obtain a wettability variable layer forming composition. Using this wettability variable layer forming composition, spine coated onto a glass substrate, and dried at 150° C. for 10 minutes to obtain a wettability variable substrate having a transparent and even wettability variable layer.

On the mask pattern side of a photomask, with a mask pattern of stripes of Cr thin layer having a width of 50 μm and a pitch of 100 μm formed on a glass substrate, a transparent photocatalyst layer was laminated by spin coating a water dispersion solution of titanium dioxide (trade name: "ST-K03", manufactured by Ishihara Sangyo Cb., Ltd.) and drying under heating. A wettability pattern was formed on the surface of the wettability variable layer by adhering the photomask to the wettability variable substrate so that the photocatalyst layer side is on the wettability variable layer side of the wettability variable substrate, and exposing to the 365 nm wavelength ultraviolet ray from the photomask side at an intensity of 20 mW/cm² by an extra-high pressure mercury lamp. The resulting wettability pattern had the characteristics that the contact angle of the unexposed part to water was 115°, the contact angle to a liquid having a surface tension of 40 mN/m was 83°, the contact angle of the exposed part to water was 10° or less and took 120 seconds until the contact angle to a liquid having a surface tension of 40 mN/m became 9° or less. Also, the width of the unexposed part was 49 μm and the width of the exposed part was 51 μm.

Example 2

A wettability pattern was formed in the same manner as in Example 1 except that the ratio of each component to be compounded was 0.59 g of tetramethoxysilane (trade name: TSL8114, manufactured by GE Toshiba Silicones Co., Ltd.), 5.91 g of fluoroalkylsilane (trade name: TSL8223, manufactured by GE Toshiba Silicones Co., Ltd.) and 2.36 g of 0.005N HCl (aqueous solution). The resulting wettability pattern had the characteristics that the contact angle of the unexposed part to water was 120° and the contact angle to a liquid having a surface tension of 40 mN/m was 89°, the contact angle of the exposed part to water was 10° or less, and took 230 seconds until the contact angle to a liquid having a surface tension of 40 mN/m became 9° or less. Also, the width of the unexposed part was 49 μm and the width of the exposed part was 51 μm.

Example 3

A wettability pattern was formed in the same manner as in Example 1 except that the ratio of each component to be compounded was 6.19g of tetramethoxysilane (trade name: TSL8114, manufactured by GE Toshiba Silicones Co., Ltd.), 0.31 g of fluoroalkylsilane (trade name: TSL8223, manufactured by GE Toshiba Silicones Co., Ltd.) and 2.36 g of 0.005N HCl (aqueous solution). The resulting wettability pattern had the characteristics that the contact angle of the unexposed part to water was 105°, the contact angle to a liquid having a surface tension of 40 mN/m was 72°, the contact angle of the exposed part to water was 10° or less and took 90 seconds until the contact angle to a liquid having a surface tension of 40 mN/m became 9° or less. Also, the width of the unexposed part was 49 μm and the width of the exposed part was 51 μm.

Comparative Example 1

A wettability variable layer forming composition was obtained in the same manner as in Example 1 except that the ratio of each component to be compounded was 5 g of tetramethoxysilane (trade name: TSL8114, manufactured by GE Toshiba Silicones Co., Ltd.), 1.5 g of fluoroalkylsilane (trade name: TSL8223, manufactured by GE Toshiba Silicones Co., Ltd.) and 0.2 g of 0.005N HCl (aqueous solution). Using the resulting wettability variable layer forming composition, a glass substrate was coated with it. However, because the adhesion of the wettability variable layer forming composition to the surface of the glass substrate was insufficient, the glass substrate repelled the wettability variable layer forming composition and no wettability variable layer could be formed.

Comparative Example 2

A wettability variable substrate was formed in the same manner as in Example 1 except that the ratio of each component to be compounded was 5 g of tetramethoxysilane (tradename: TSL8114, manufactured by GE Toshiba Silicones Co., Ltd.), 1.5 g of fluoroalkylsilane (trade name: TSL8223, manufactured by GE Toshiba Silicones Co., Ltd.) and 2.36 g of 0.1N HCl (aqueous solution). The wettability variable layer of the resulting wettability variable substrate was cloudy because an excess fluorine type component remained on the surface.

Comparative Example 3

A wettability variable layer forming composition was obtained in the same manner as in Example 1 except that in the ratio of each component to be compounded, tetramethoxysilane was not compounded, and 6.5 g of fluoroalkylsilane (trade name: TSL8223, manufactured by GE Toshiba Silicones Co., Ltd.) and 2.36 g of 0.005N HCl (aqueous solution) were compounded. Using the resulting wettability variable layer forming composition, a glass substrate was coated with it. However, because the adhesion of the wettability variable layer forming composition to the surface of the glass substrate was insufficient, the glass substrate repelled the wettability variable layer forming composition and no wettability variable layer could be formed.

What is claimed is:

1. A pattern formed body comprising a wettability pattern consisting of an unexposed area whose contact angle to a liquid having a surface tension of 40 mN/m is 10° or more, and an exposed area whose contact angle to a liquid having a surface tension of 40 mN/m is 9° or less, wherein the pattern formed body is obtained by exposing the surface of a wettability variable layer of a wettability variable substrate in a pattern, under a condition that the wettability variable layer is facing to a photocatalyst layer containing a photocatalyst, thus obtained pattern formed body does not contain the photocatalyst, the wettability variable substrate comprising a wettability variable layer, on a substrate, which the wettability is varied by being exposed under the condition that the wettability variable layer is facing to the photocatalyst layer containing a photocatalyst, and the wettability variable layer before an exposure: contains an organopolysiloxane which is a co-hydrolysis condensation polymer obtained using (A) one type or two or more types of organopolysiloxane precursors represented by $Y_nSiX_{(4-n)}$ (Y represents an alkyl group or a fluoroalkyl group, or a substituent containing these groups, X represents an alkoxyl group, an acetyl group or a halogen, a letter n subscripted to Y and a letter n in (4-n) subscripted to X are an integer from 1 to 3), and (B) an amorphous silica precursor represented by $SiX_4$ (X is the same as above) by a mass ratio of (A)/(B)=1/0.1 to 1/20;

does not contain the photocatalyst; and wettability of a surface of the wettability variable layer has a contact angle to a liquid having a surface tension of 40 mN/m is 10° or more.

2. A functional element obtained by laminating a functional layer made of a raw material different from the raw material constituting the wettability variable layer, on the surface of the wettability variable layer along the wettability pattern of the pattern formed body according to claim 1.

3. The pattern formed body according to claim 1, wherein the organopolysiloxane is a co-hydrolysis condensation polymer obtained using a wettability variable layer forming composition comprising said (A), said (B) and (C) an aqueous solution containing an acid having an acid concentration of 0.0005N to 0.05N, and the wettability variable layer forming composition comprises the component (A), (B) and (C) by a mass ratio of (C)/((A)+(B))=1/0.25 to 1/30.

* * * * *